United States Patent
Paxton et al.

(10) Patent No.: US 6,238,579 B1
(45) Date of Patent: May 29, 2001

(54) DEVICE FOR SEPARATING SOLID PARTICLES IN A FLUID STREAM

(75) Inventors: Blaine K. Paxton, Oakland; Laurence E. Allen, San Rafael; Larry G. Heald, Concord, all of CA (US)

(73) Assignee: MBA Polymers, Inc., Richmond, CA (US)

( * ) Notice: Subject to any disclaimer, the term of this patent is extended or adjusted under 35 U.S.C. 154(b) by 0 days.

(21) Appl. No.: 09/311,174

(22) Filed: May 13, 1999

Related U.S. Application Data
(60) Provisional application No. 60/085,187, filed on May 12, 1998.

(51) Int. Cl.[7] ............................... B01D 21/20; B04C 3/00
(52) U.S. Cl. .................. 210/787; 210/512.1; 210/512.2; 209/715; 209/717; 209/719; 209/720; 209/722; 209/723; 209/725; 209/728; 209/729; 209/733; 209/734; 209/788; 55/459.1; 55/459.2; 55/459.3; 55/459.4; 55/459.5
(58) Field of Search ............................... 210/512.1, 512.2, 210/787, 788; 209/715, 717, 719, 720, 722, 723, 725, 728, 729, 733, 734; 55/459.1, 459.2, 459.3, 459.4, 459.5

(56) References Cited

U.S. PATENT DOCUMENTS

| | | |
|---|---|---|
| 453,105 | 5/1891 | Bretney . |
| 3,802,570 | 4/1974 | Dehne . |
| 4,744,890 | 5/1988 | Miller et al. . |
| 4,838,434 | 6/1989 | Miller et al. . |
| 4,865,751 | 9/1989 | Smisson . |
| 5,104,520 | 4/1992 | Maronde et al. . |
| 5,129,930 | * 7/1992 | Gauthier et al. .................. 210/512.1 |
| 5,186,836 | * 2/1993 | Gauthier et al. .................. 210/512.1 |

FOREIGN PATENT DOCUMENTS

| | | |
|---|---|---|
| 506488 | 10/1938 | (GB) . |
| 528590 | 5/1939 | (GB) . |

OTHER PUBLICATIONS

D. Bradley 1965 "Equipment of the Cyclone Type" *The Hydrocyclone* (12):253–264; 299–314.

L. Svarovsky 1984 "Types of Hydrocyclones Available" *Hydrocyclones* 58–82.

* cited by examiner

*Primary Examiner*—David A. Reifsnyder
(74) *Attorney, Agent, or Firm*—Fish & Richardson P.C.

(57) ABSTRACT

The present invention provides for discharge (exit) ports for exit fluid flow disposed at or adjacent to one another on one end of a vortex separating body; an inlet port(s) disposed at one end of a separating body having discharge (exit) ports for exit fluid flow disposed at or adjacent to one another at an opposite end of the separating body; increased separation efficiency; solid mass separated per unit energy expended; a body that is predominantly cylindrical in shape that can be made inexpensively from standard sizes of pipe or tubing; a device that is predominantly cylindrical in shape so that the separation (vortex) length of the device can be changed simply by installing or removing sections of pipe or tubing; a device which promotes smooth rotational flow within the vortex region, therefore affecting an efficient separation of particles carried by the transporting fluid therein and reducing the pressure and/or energy required to move the fluid through the device; a device with entrance and especially with exit ports that are predominantly closed to the atmosphere so that exit fluid can be cleanly and efficiently transported from the device to a subsequent location or an additional device, especially another separator.

29 Claims, 11 Drawing Sheets

DEVICE FOR SEPARATING SOLID PARTICLES IN A FLUID STREAM

CROSS-REFERENCES TO RELATED APPLICATIONS

This application claims the benefits of Provisional Patent Application Ser. No. 60/085,187, filed on May. 12, 1998.

BACKGROUND

1. Field of Invention

This invention relates to devices that are used to separate solid materials having some differing physical characteristic, e.g., density, especially to those devices which separate respective different divided solids having some corresponding different physical characteristic when suspended in a transporting fluid under the influence of centrifugal force disposed within a containment (a vortex body) transporting the fluid between inlet(s) and outlet(s).

2. Description of Prior Art

Numerous methods have been employed for separating divided solids suspended in moving fluids (fluid streams). Many methods take advantage of the hydrostatic forces acting on buoyant solids when placed in a liquid medium. This "buoyant" force can be imparted by natal gravitational force or by centrifugal force. In general, the methods that employ centrifugal force have higher throughput rates and/or perform more accurate separations than those that rely on gravity alone.

Some devices that separate solids by the use of centrifugal force use motors or other physical means of supplying energy to impart a centrifugal motion to the fluid. Devices of this sort have traditionally been referred to as "centrifuges", a typical example of which is described by Brandrup et al. These devices are, in general, effective at separating solids, however they usually have many moving parts, and therefore are subject to mechanical failure and require routine maintenance. They are also usually difficult to manufacture and therefore expensive.

Many devices that separate solids by the use of centrifugal force consist of a stationary cylindrical or conical body into which a moving slurry of a liquid medium having divided solids (solid particles) suspended therein is admitted or introduced. The moving slurry may be brought in to a separating (vortex) body through a fluid entrance or inlet from a container at a higher elevation, taking advantage of the pressure 'head' or be introduced from a source driven by a pump.

The fluid inlet may be oriented tangentially to the vortex axis of the separator body, so the momentum of the inlet fluid imparts or adds to a rotational flow to the rotating fluid contained in the device The oldest and most traditional of these devices is called a hydrocyclone. The first hydrocyclone was described by U.S. Pat. No. 453,105 to Bretney. Although the hydrocyclone was originally patented for the use of removing water from dense solids ("dewatering'), the fundamental shape of the device has stayed the same. Hydrocyclones were first applied to the separation of solids in the field of "coal benefaction", and one of the first patents for this application was awarded by U.K. Patent 528,590 to the Directie van de Staatsmijnen.

Hydrocyclones have high throughput rates, require very little maintenance, and are inexpensive to construct and operate. However, they do not effectively separate solids that have small differences in density. This is due to the fact that a substantial amount of turbulence is generated inside the hydrocyclone. This turbulence is primarily due to the fact that the two exit ports are at different (opposing) ends of the device.

To understand why exit ports at different ends of the device negatively affect the separation, it is useful to analyze the flow inside a device in terms of its directional components. Using the parlance of cylindrical coordinate systems, these components are angular (or "rotational"), radial, and axial with respect to an axis defining the circulating fluid (the vortex). The centrifugal forces that separate particles from each other are imparted by the rotational component of the flow field, but the other components of flow, the radial and axial, tend to disrupt the separating effects of the rotational flow. Devices that have the two outlet ports at different ends of the device generate excessive radial and axial flows that disrupt the separating effects imparted by the rotational component of the flow.

Numerous other variations of the hydrocyclone have been invented. For example, U.S. Pat. No. 3,802,570 to Dehne claims a novel exit port and U.S. Pat. No. 4,838,434 to Miller et al claims an air-sparged hydrocyclone. (An "air-sparged" hydrocyclone is one with a fritted porous wall through which compressed air is injected. The air typically aids in separating "fines" from coarse particles or hydrophobic particles form hydrophilic particles.) However, all of the hydrocyclone variations still incorporate exit ports that are on opposite ends of the device.

Other devices have been used for separating particles in a liquid medium. One of the more useful is referred to as the "Dyna-Whirlpool" separator, described by Goldberger and Robbins (1984). This device is predominantly cylindrical and has both an entrance port and an exit port at both ends of the device. A liquid feed enters at one end and a slurry feed at the other. The separated particles exit from tangential and axial ports at opposite ends of the device. This device is similar in principal to a hydrocyclone but is more complicated to operate because two streams need to be supplied to the unit, and therefore two pumps need to be employed.

There are a few patents that describe devices having both outlet ports on the same end. A first is U.K. Patent 537,771 by Alexander in 1940 "Improvements in Centrifugal Separators for Extracting Solids from Liquids" (the Alexander patent). Alexander distinguishes his improved centrifugal separator (FIGS. 1–6) from the then existing prior art separator devices which have fluid inlet ('admission') and fluid outlet ('discharge') at the same one end of the 'vortex' chamber. In column 1 lines 48–57 he describes the improved separator as having:

"the inlet (reference number 7 in the Figures) is at or near the circumference at one end and the outlet (reference number 4) is of less diameter and centrally situated, or nearly so, at the other end of the vortex. The said inlet being of single or multiple tangential type, or vaned or vaneless type, and the said outlet being of plan circular or annular section and the flow in which is in a direction away from the inlet"

Alexander thus shows and describes one or more inlets 7 at one end of the "vortex" separating chamber and a single fluid outlet 4 at the other. The inlets 7 are shown having inlet steam(s) directed along various orientations with respect to the vortex axis; e.g., tangential to the chamber outer circumference and perpendicular, oblique or askew to the vortex axis, or parallel to or coaxial with the vortex axis.

Alexander also shows a closed "receptacle or hopper" 8 situated in spaced apart relationship to the inlet(s) in FIGS. 1, 4, 5, and 6. The 'hopper' 8 is described as positioned so that it "receives the extracted comparatively dense material." (columns 3, line 33, 34). The hopper 8 is shown variously as parallel to the outlet axis or coaxial therewith at the same end of the 'vortex chamber' as the outlet. Alternatively the hopper is shown at right angles to the chamber vortex axis and also perpendicular to either or both the inlet and outlet.

Alexander's claim 1 refers to "an admission passage or passages for admitting the liquid with a tangential component of motion to the vortical chamber" and "another passage or passages—through which the said extracted material is transferred to the receptacle;" (column 4, lines 118–124).

Thus it is clear that Alexander's device is restricted to separators with a single fluid outlet that provides a single outlet stream. Also the separators of Alexander's patent are not restricted to having tangential inlets, but include inward projecting inclined vanes for producing 'vortical' separator flow.

Alexander's devices, it is clear, were designed and patented specifically for the application of removing solids from a single liquid stream (i.e. "dewatering") and depositing them in a fixed, closed receptacle while directing the liquid to be discharged at a single exit or port.

Alexander's devices would not facilitate separating two (or more) suspended solids (divided particles) from each other, as there is only one receptacle and one outlet stream. Another separator device is described in U.S. Pat. No. 5,224,604 by Duczmal et al. (Duczmal) Duczmal is concerned with improvements in separator devices combining multiple forces: centrifugal force, Fc (vortex, e.g., hydrocyclone effects), magnetic repelling force, Fr (on diamagnetic particles), and hydrostatic force, Fh, i.e., the flotation effect on air-bubble/particle aggregates, specifically for hydrophobic particulates.

Duczmal's devices develop a radial distribution of particles suspended in fluid flowing in the vessel by the combined hydrostatic, magnetic and centrifugal forces. Separation of particles from the distribution is enhanced by a "stream splitter" (column 10, line 55) capturing different portions of the swirling fluid in the vessel taking advantage of different combinations of forces causing particles of different characteristics to move in different directions.

Embodiments of the Duczmal patent show a predominately circular hydrocyclone vessel with fluid inlet at one end and fluid outlet or outlets at the opposed end. All of the embodiments of the Duczmal disclosure have at least one of the exit outlets configured as an annular exit opening i.e., disposed around the complete circumference of the vessel at or near the exit end of the vessel. The annular exit opening discharges a portion or all of the exit fluid in an unconstrained manner open to the environment, e.g., as an "outward splayed fluid stream" column 8, line 48.

The outward splayed exit fluid sprays substantially radially from the axis of the unit. This feature is disadvantageous for several reasons:

(a) The fluid exiting the device typically must be caught by a tank or trough that would take up considerable floor space and would tend to require extra time and labor to maintain or be unsafe, in the case where the exit fluids contain harmful or undesirable materials, e.g., sewage.

(b) the fact that the fluid exits directly to the atmosphere limits the exit pressure and consequently limits the fluid pressure distribution within a hydrocyclone vessel of a given size (and therefore limits fluid rotational speed) inside the device and thus separation efficiency: recovered mass per unit energy expended, (c) If the exiting fluid needed to be transported to a different location at higher elevation than the discharge level, another pump would have to be employed, whereas with a constrained, i.e., sealed exit port, the exiting fluid passing downstream from the separating exit could retain sufficient pressure to move the downstream fluid through a coupled pipe to another location or as an input to a following device such as another separator.

Additionally, the Duczmal patent deals specifically with devices that impart electrical charges to the particles or that use magnetic fields to aid in the separation of the particles.

In summary, all of the stationary prior art separation devices disclosed suffer from at least one of the following deficiencies:

(a) Separators having outlets at different ends of the device, tend to cause excess turbulence (i.e., energy loss) from directing the fluid flow in opposing directions, and lessened efficiency in transferring motional energy from the input stream to the rotational separating forces in the separating chamber or body. This turbulence not only results in reduced separation efficiency, but it also leads to excess differential pressure loss along the separation body thus higher inlet pressure required to pump fluid at a given rate through the device.

(b) Dividing the inlet fluid flow toward two or more widely separated exits causes excess friction loss for a given volume flow rate: e.g., for a single inlet flow of a given volume flow rate directed into a channel or channels with widely separated exit ports causes extra friction loss along the external channel walls between the spaced apart exit ports.

(c) In the case of conical devices, their manufacture can be expensive due to the fact that unique casting molds have to be manufactured.

(d) Devices that do have two spaced apart passages for receiving fluid or solid material from the separating fluid stream have either not allowed for two spaced apart exit fluid streams or have at least one exit port that allows unconstrained exit fluid flow thus potentially wasting fluid energy and/or prohibiting retention of fluid energy for subsequent use.

SUMMARY

Objects and Advantages

The present invention provides:

discharge (exit) ports for exit fluid flow disposed at or adjacent to one another on one end of a vortex separating body;

an inlet port(s) disposed at one end of a separating body having discharge (exit) ports for exit fluid flow disposed at or adjacent to one another at an opposite end of the separating body;

increased separation efficiency; solid mass separated per unit energy expended.

a body that is predominantly cylindrical in shape that can be made inexpensively from standard sizes of pipe or tubing.

a device that is predominantly cylindrical in shape so that the separation (vortex) length of the device can be changed simply by installing or removing sections of pipe or tubing.

- a device which promotes smooth rotational flow within the vortex region, therefore affecting an efficient separation of particles carried by the transporting fluid therein and reducing the pressure and/or energy required to move the fluid through the device.
- a device with entrance and especially with exit ports that are predominantly closed to the atmosphere so that exit fluid can be cleanly and efficiently transported from the device to a subsequent location or an additional device, especially another separator.

Still further objects and advantages will become apparent from a consideration of the ensuing description and drawings.

BRIEF DESCRIPTION OF THE DRAWINGS

In the drawings, closely related figures have the same number but different alphabetic suffixes.

Figure 1:
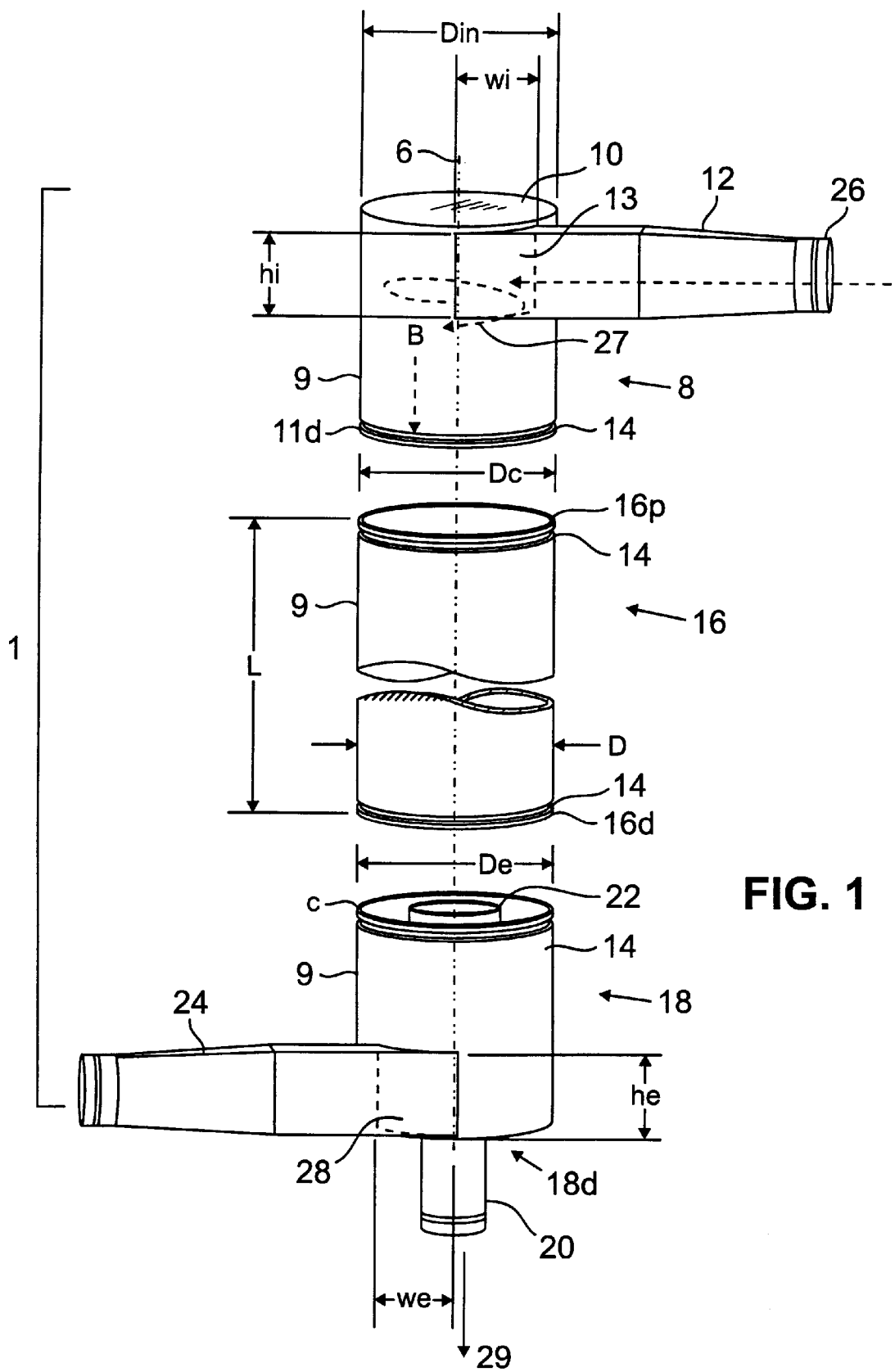
FIG. 1 shows an exploded perspective view of one preferred embodiment of a separator device in accordance with the present invention.

The present invention is a separation device for separating compositions of two or more materials having one or more physical properties with distinctly different characteristics, carried in a transporting fluid. The separation device of the present invention includes a stationary body for separating two different types of divided solids (different solid particles) suspended in a fluid media (a slurry) based on characteristic differences selected from the group of density, shape, size, orientation and surface properties in the flowing medium. The apparatus consists of a body having a rotational symmetry spaced away from a corresponding longitudinal central axis (a vortex body), permitting rotational fluid flow about the axis and axial flow along the axis, i.e. a net helical flow along and within the vortex body.

The device has a fluid inlet for receiving the fluid/slurry at or near a proximal end of the device. The inlet includes means for accepting an inlet fluid having a substantial component of fluid motion substantially oblique to the vortex axis and substantially tangential to the vortex body.

The inlet is disposed so that the inlet fluid smoothly joins into and supports the rotation of fluid media moving rotationally and axially (i.e., helical motion) within the body. The body extends continuously away from the inlet to a distal exit end maintaining a rotational symmetry about the vortex axis to smoothly support the helical fluid flow from inlet to exit end.

Exit outlets are disposed at the exit end spaced sufficiently distal from the inlet that a substantial portion of one of the two suspended solids thereat has separated radially from the other suspended solid under the influence of the vortex body. The substantial portion of the one suspended solid is thus concentrated near the exit end of the outer wall of the body.

The exit end is provided with exit outlets disposed to smoothly receive the helical fluid flow as an exit fluid flow thereat. A first exit outlet is disposed at the exit end for receiving a substantially axial fluid flow component of the exit fluid flow and has an axial exit aperture receiving the axial flow portion therethrough. The axial exit aperture is oblique (preferably perpendicular) to the vortex axis and substantially surrounds the vortex axis (preferably coaxial therewith). The first exit outlet is substantially parallel to the vortex axis at the exit end for smoothly receiving the axial exit flow.

A second exit outlet is disposed at or near the exit end, adjacent to and spaced apart from the first exit outlet. The second exit outlet is preferably disposed along the circumference of the vortex body and includes a second exit aperture for receiving a substantially tangential fluid flow component of the exit fluid flow therethrough. The second exit outlet is oriented with respect to the vortex axis and the vortex body to smoothly receive the substantial tangential fluid flow component therein. The suspension is thus directed to flow towards the two spaced apart exit outlets (ports) located at the end opposite to the inlet end of the body, and the two spaced exit ports are disposed to conduct separated portions of the two solids separately from the two exit ports.

DESCRIPTION—FIGS. 1 TO 9

A first embodiment of the present separation invention is illustrated as device 1 in FIG. 1. Device 1 includes three hollow (preferably tubular) sections 8, 16, 18 disposed along a common central axis 6. Specifically inlet section 8 is followed by a body section 16 (the vortex body) which is followed subsequently by an outlet section 18, Each section 8, 16, 18 has respectively spaced apart proximal and distal open ends with the axis 6 therethrough. Sections 8, 16 and 18 are sealingly joined at respective adjacent distal and proximal open ends to form a continuous common outer wall 9 spaced outward away from the axis 6, defining a continuous fluid flow channel therewithin from inlet section 8 to outlet section 18. The sections 8, 16, and 18 are preferably configured to define the outer wall 9 having rotational symmetry (e.g., as circular cylinders) about the common central axis 6.

A hollow inlet or entrance port 12 is sealingly mounted at one end to the wall 9 adjacent to the inlet or proximal end lip of the inlet section 8, and defines in the wall 9 therethrough an entrance inlet aperture 13. The entrance port 12 is oriented with respect to the axis 6 and outer wall 9 such that a flowing liquid/solid slurry (stream 26) can be introduced by an external fluid flow forcing means, (not shown, e.g. a pump, a pressure head and the like) through the aperture 13 into the proximal end of the inlet section 8. Optimal entry of the inlet stream 26 is achieved by orienting the port 12 and aperture 13 so the stream 26 is substantially tangential to the wall 9 at the point of entry (aperture 13).

Figure 1A:
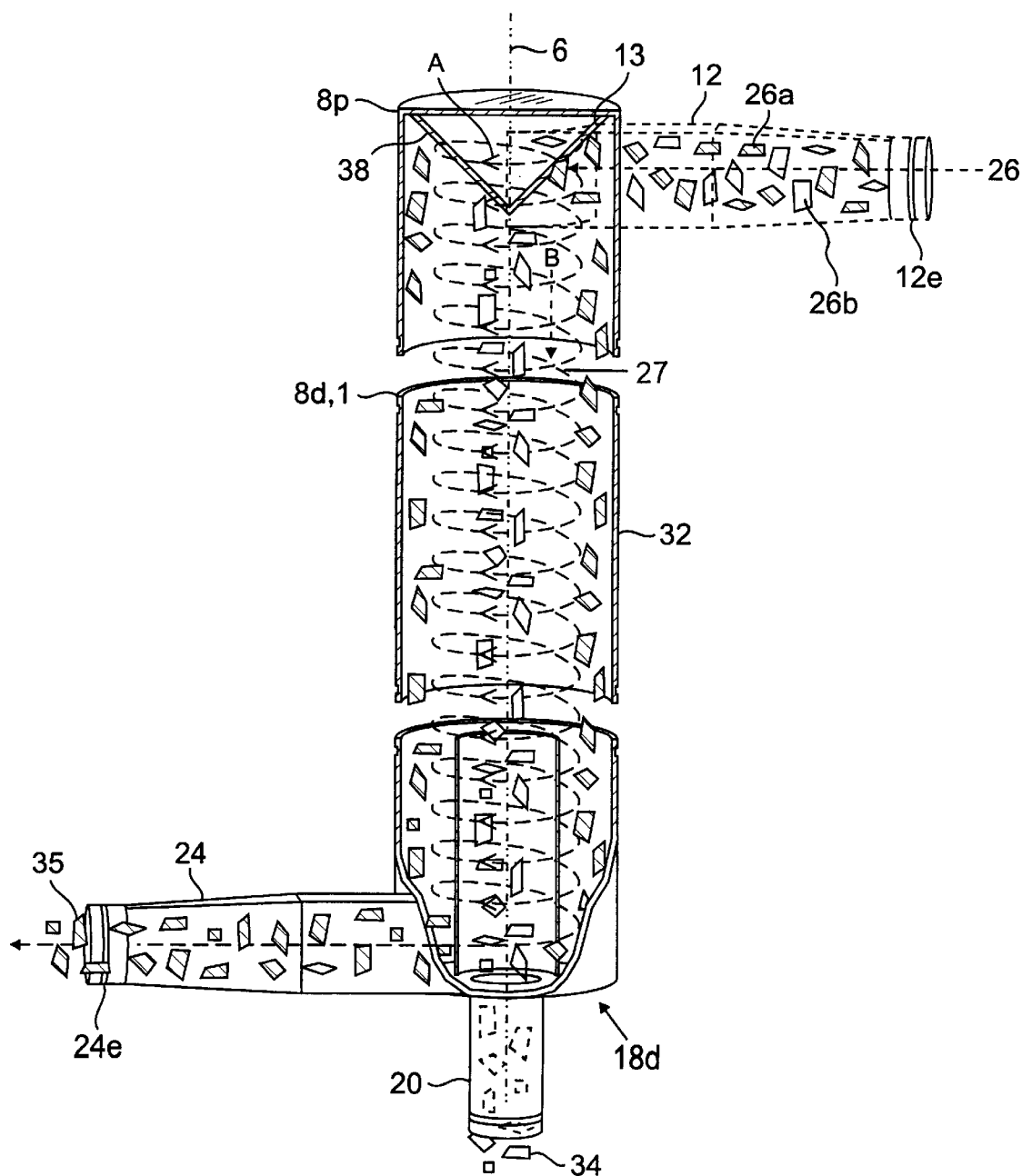
FIG. 1A depicts solid particles of two different types being separated in the device of FIG. 1.

The section of wall 9 depicted as forming the inlet aperture 13 in FIG. 1 and 1A shows a rectangular aspect, of dimensions wi, hi along and perpendicular to the circumference 2 D1. Other aspects may be selected as more suitable for interfacing with inlets 12 having different geometry, e.g., of circular or other section.

Slurry stream 26 includes therewith a mixture of (at least two) particulate materials, 26a, 26b (see FIG. 1A) having a common physical property (e.g., density, shape, size, orientation and surface properties) characterized by a different characteristic value, range or distribution. The materials 26a and 26b are suspended as divided solids in the fluid 26.

Slurry 26 enters through the aperture 13 into the inlet section 8. The port 12 is disposed to direct the slurry stream 26 through the aperture 13 spaced apart from the axis 6 by essentially a first inlet section diameter Din and oriented substantially tangential to the wall 9 thereat.

The tangential orientation of this entrance port 12 with respect to the curving wall 9 (combines with inlet forcing pressure, not shown, supplied by the external fluid flow forcing means) causes the slurry stream 26 to rotate around the axis 6 while moving axially along axis 6, i.e. (in a helix, indicated by clockwise helical arrow 27 around the axis 6) within the inlet section 8. The inlet section 8 has a proximal end 8p and distal end 8d spaced apart along the axis 6 with the port 12 disposed between. A proximal end cap 10 seals the proximal end 8p of inlet section 8 and causes the rotating slurry 27 to progress helically down the device 1 toward outlet section 18.

One of the advantages of this device is that it can be constructed out of standard-sized pipe or tubing thereby allowing respective adjacent ends 8d, 16p and 16d, 18p of sections 14, 16, and 18 to be attached by any of the numerous methods of joining pipe, known to someone skilled in the art. Examples of these methods include flanges, threads, welds, and compression fittings. The preferred method of joining these sections is by removable couplings (not shown), which sealingly and releaseably fit into grooves 14 cut into the ends of the pipe. These couplings, which are well known in the art, consist of two or three members (not shown) that are bolted together and compress a gasket (not shown) sealingly around two adjacent ends of pipe to form a liquid-tight seal thereat. As these couplings are well known to those skilled in the art, they are not pictured in the figures. Alternatively, the device 1 may be configured as a continuous, seamless fluid impermable wall 9 defining contiguous fluid conducting sections 8, 16 and 18 defined sequentially therein.

The rotating fluid Stream 27 progresses helically from the inlet section 8, along the axis 6, through the body section 16, from proximal end 16p to distal end 16d. The body section 16 can be made in any shape that allows rotational flow of the slurry Stream 27 along the axis 6. In embodiment 1 section 16 is shown as essentially a simple cylinder. The body section 16 may have a length L that is greater or less than central section diameter Dc.

The rotating fluid 27 enters the outlet section 18, proximal end 18p, which is connected to the body section 16 by means of a groove 14 as discussed previously. The outlet section may or may not have a "vortex finder" 22 attached therein. (The details of the "vortex finder" will be discussed in relation to FIG. 3.)

Referring now to FIG. 1A, the mixed particles 26a, 26b in the inlet stream 26 at the inlet end 8 have substantially separated into separate fluid streams 34 and 35 by the time they reach the outlet section 18. The solid particles 26a have substantially migrated as separated particles 35 away from the axis 6 of the device 1 and are removed by means of a tangential exit port 24. The solid particles 26b have substantially migrated or remain as separated particles 34 inwards towards the axis 6 of the device 1 are removed by means of cylindrical exit port 20 disposed coaxial with the device axis 6.

Figure 2A:
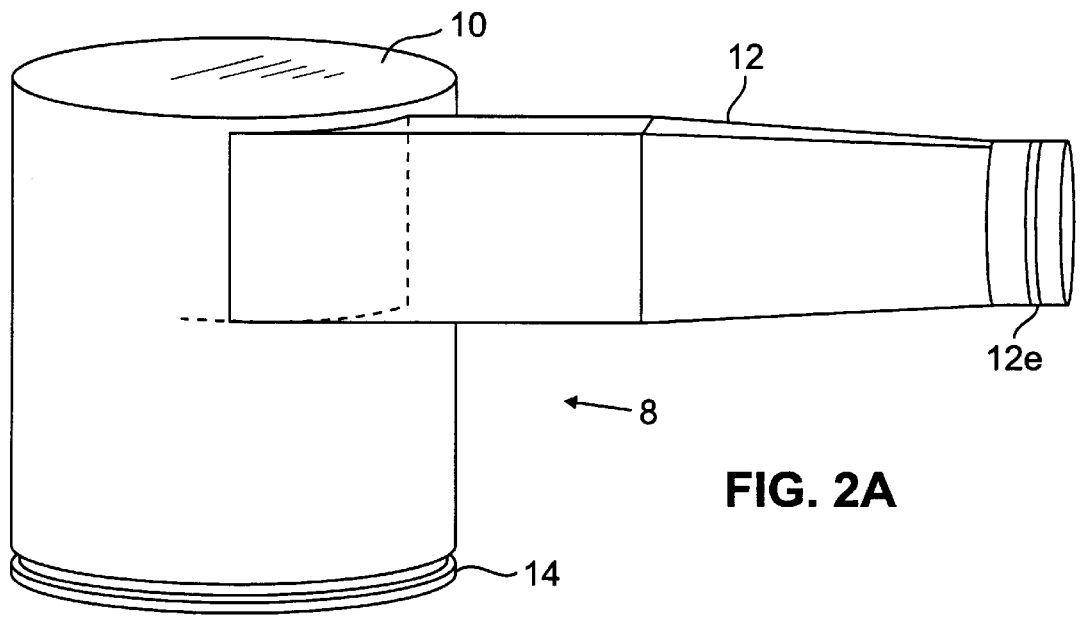
FIG. 2A shows a detail exterior view of the inlet section of the device of FIG. 1.
Figure 2B:
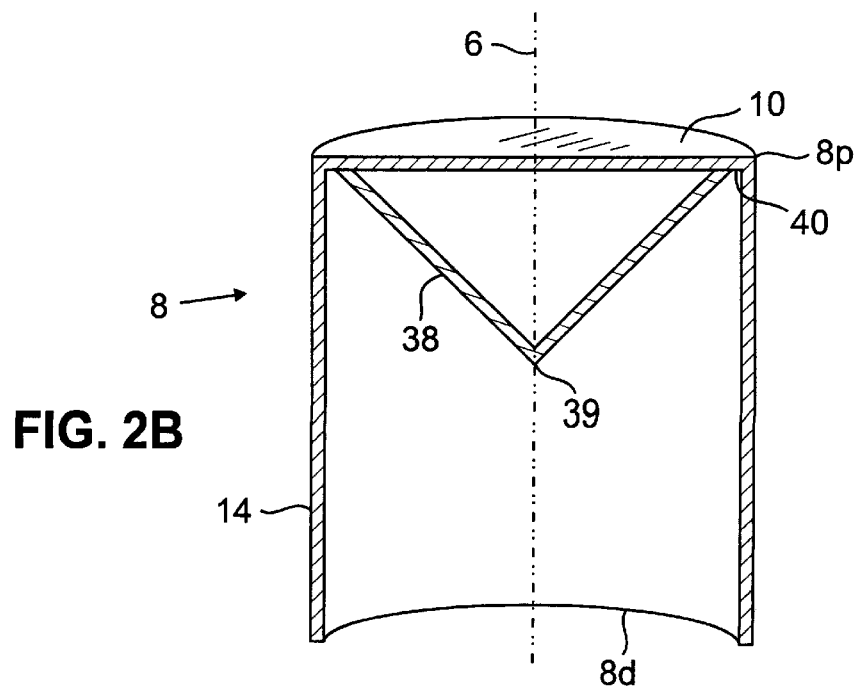
FIG. 2B illustrates a detail cut away perspective of the inlet section of device embodiment of FIG. 1 in accordance with the present invention.

FIGS. 2A and 2B show details of a typical embodiment of the inlet section 8. The cut-away view in FIG. 2B shows a cone 38 aligned coaxial with common central axis 6 having apeak 39 and base 40 that are centered on and coaxial with the axis 6 of the inlet section 8. The base 40 is disposed adjacent to the end cap 10 with the peak 39 disposed inside the inlet section 8 projecting distally away from the proximal end cap 10. The preferred material for the cone 38 is a metal that is similar to that of the wall 9 of device 1, and the preferred method of attaching the base 40 to the cap 10 is by welding. The cone 38 aids in changing the tangential velocity of the incoming slurry 26 and redirecting it as helical slurry flow 27, flowing distally along the axis 6 down the length of the separation device 1.

Figure 3:
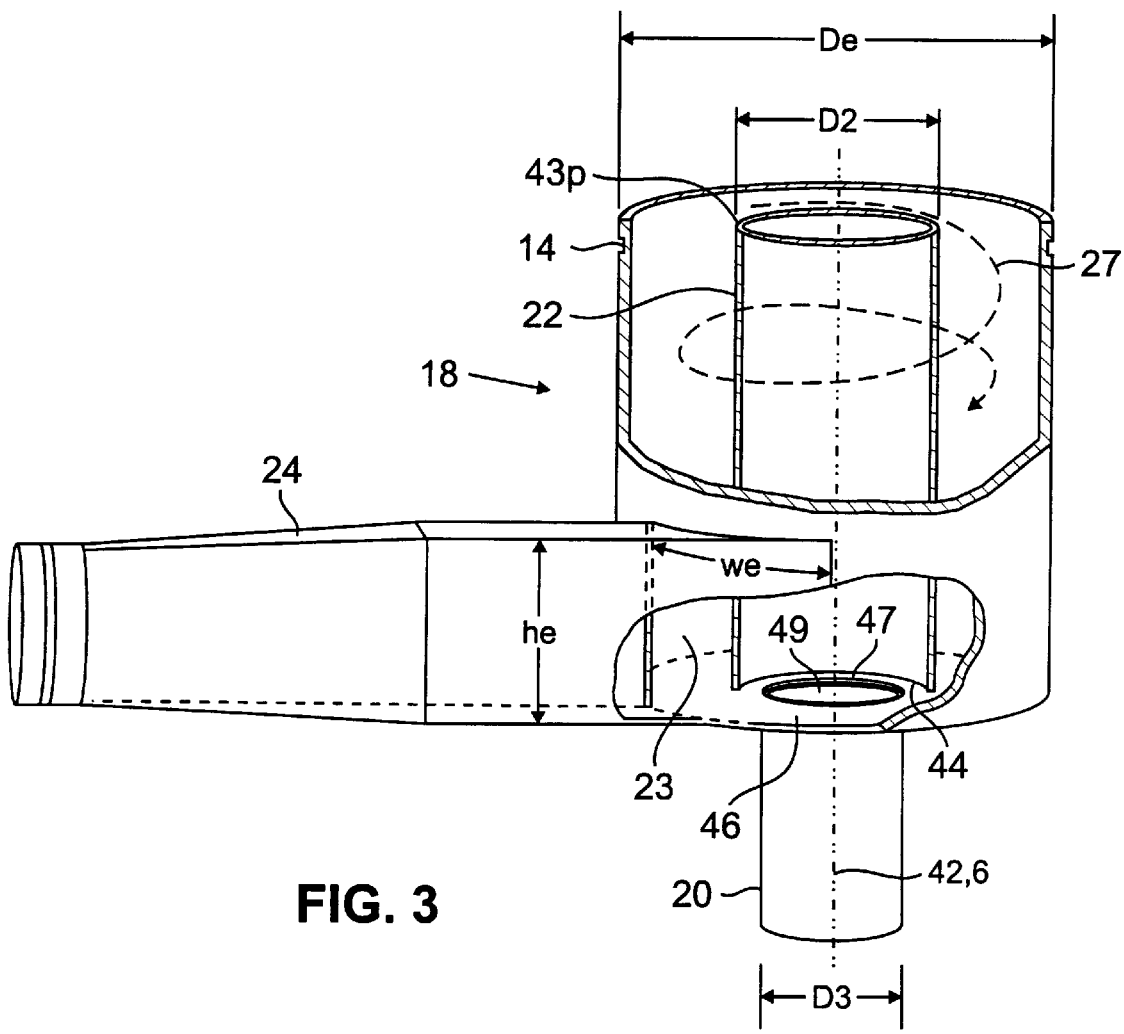
FIG. 3 is a partially cut away view of the outlet section of the device in FIG. 1 depicting details of the exit port.

FIG. 3 shows details of a typical embodiment of the outlet section 18 With an optional vortex finder 22 disposed therein. The term "vortex finder" is borrowed from a similar component found in hydrocyclones (See Svarovsky, 1977 and Bradley, 1965). The vortex finder 22 is preferably a hollow tubular cylinder member forming an open inlet end 43p and a distally spaced apart exit end perimeter 44. The inlet end 43p and exit perimeter 44 are disposed such that the member 22 has cylindrical symmetry around a longitudinal axis 42 extending therethrough. The longitudinal axis 42 is preferably aligned coaxial with the central axis 6 of the other sections 8, 16, 18.

The inlet end 43 is disposed facing proximally towards the body section 16. The base exit end perimeter 44 is fixedly attached (e.g., by welding or other permanent means) to an inward facing side of a lower end cap ring 46.

The lower end cap ring 46 has an inner exit rim 47 coaxial with the axes 6, 42. The inner exit rim 47 is disposed between the axes 6, 42 and the base end perimeter 44. The end cap ring 46 defines an axial exit aperture 49 therethrough that is disposed inside of the inner exit rim 43. The axial exit aperture 49 is preferably disposed perpendicular to the vortex axis 6 but may be placed obliquely therewith (not shown).

The vortex finder 22 has a diameter D2 less than the inner diameter D1 of the outlet section 18. The preferred material for the cone 38 is any metal that is similar to that of the device 1, and the preferred method of attaching the vortex finder 22 to the lower cap ring 46 is by welding. The diameter of the vortex finder D2 can be either greater than or less than the diameter of the inner exit port D3. (The function of the vortex finder is discussed in detail in the operation section of the application.)

Figure 4:
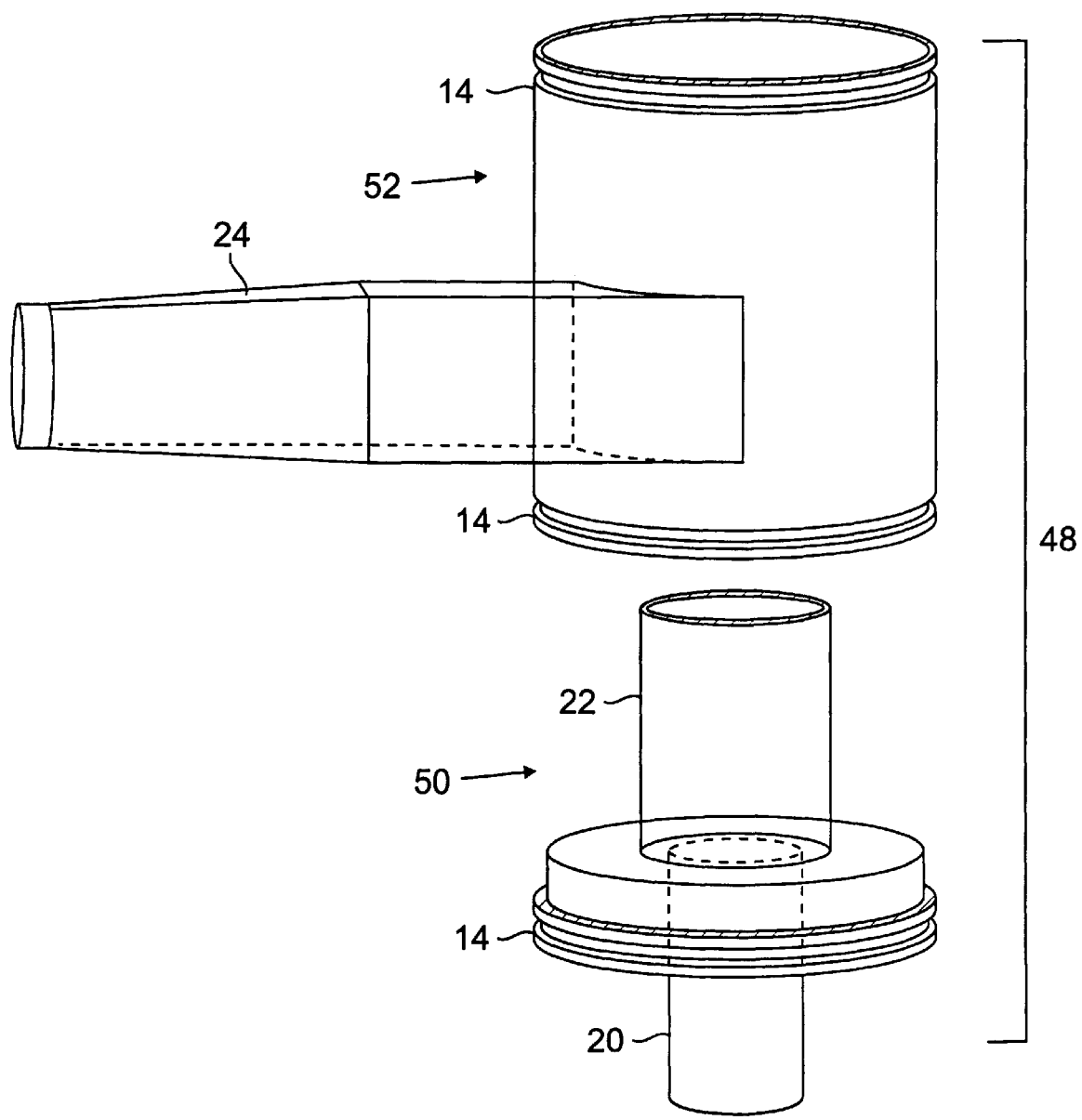
FIG. 4 depicts an alternative outlet section with a removable end-cap having an attached "vortex finder".

The vortex finder 22 that is appropriate for one application may have a different diameter D2 than that which is useful for another application. Therefore, it is useful to be able to quickly change vortex finders 22 without having to remove the entire outlet section 18. FIG. 4 shows a second embodiment 48 of the outlet section 18 which allows the vortex finder 22 and the inner exit port 20 to be removed from the rest of the device. A removable insert 50 partially slides into the outlet housing 52 and attaches to it by means of grooves 14 and clamps (not shown).

Figure 5:
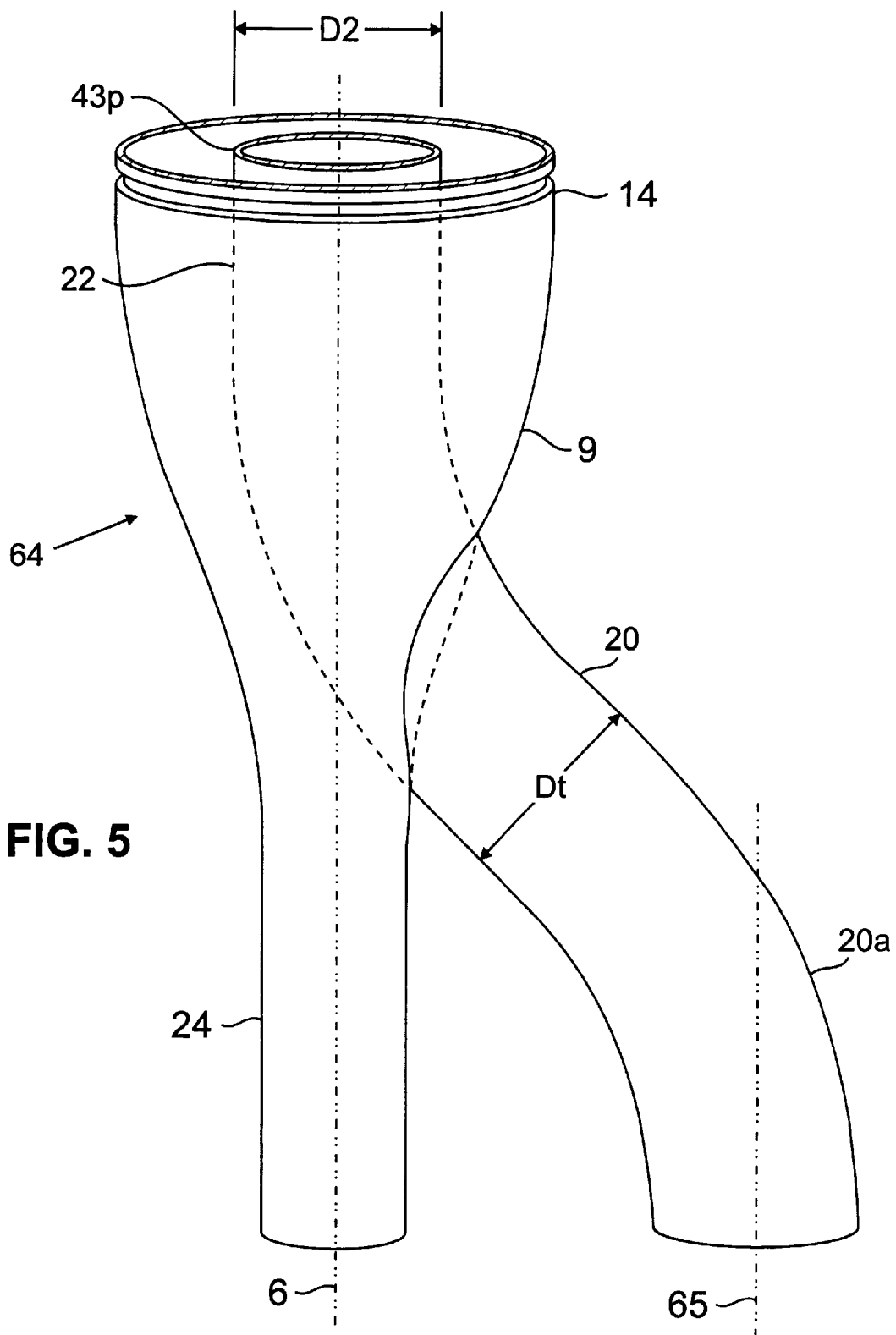
FIG. 5 shows an alternate embodiment of an outlet section of the present invention.

FIG. 5 shows an alternative tapered outlet section 64. Section 64 forms a proximal end of proximal diameter De to match the center section 16 as before. In this example section 64 tapers distally therefrom to a narrower diameter at the distal (outer) exit end 24. In this embodiment, the tubular vortex finder 22 begins as before with diameter D2 with proximal end 43p disposed inside the outlet section 64, coaxial with the vortex axis 6 and adjacent to the proximal end diameter De of the vortex wall 9. The vortex finder 22 then curves distally and outwardly away from the proximal end diameter De of section 64 and the vortex axis 6, smoothly and seamlessly transitioning through chamber wall 9 as a curved section of inner exit end 20 between the proximal receiving end and distal outer exit end 24 of section 64. After smoothly transitioning through the wall 9 exit port 20 recurves oppositely back toward the end section 64 and toward the axis 6 until it is once again parallel to exit end 24 at distal section 20a, aligning essentially adjacent and spaced away therefrom.

The two exit ports 20a and 24 are then essentially aligned to provide configurational (i.e. plumbing) advantages when the unit is integrated into a full separation system.

Figure 6:
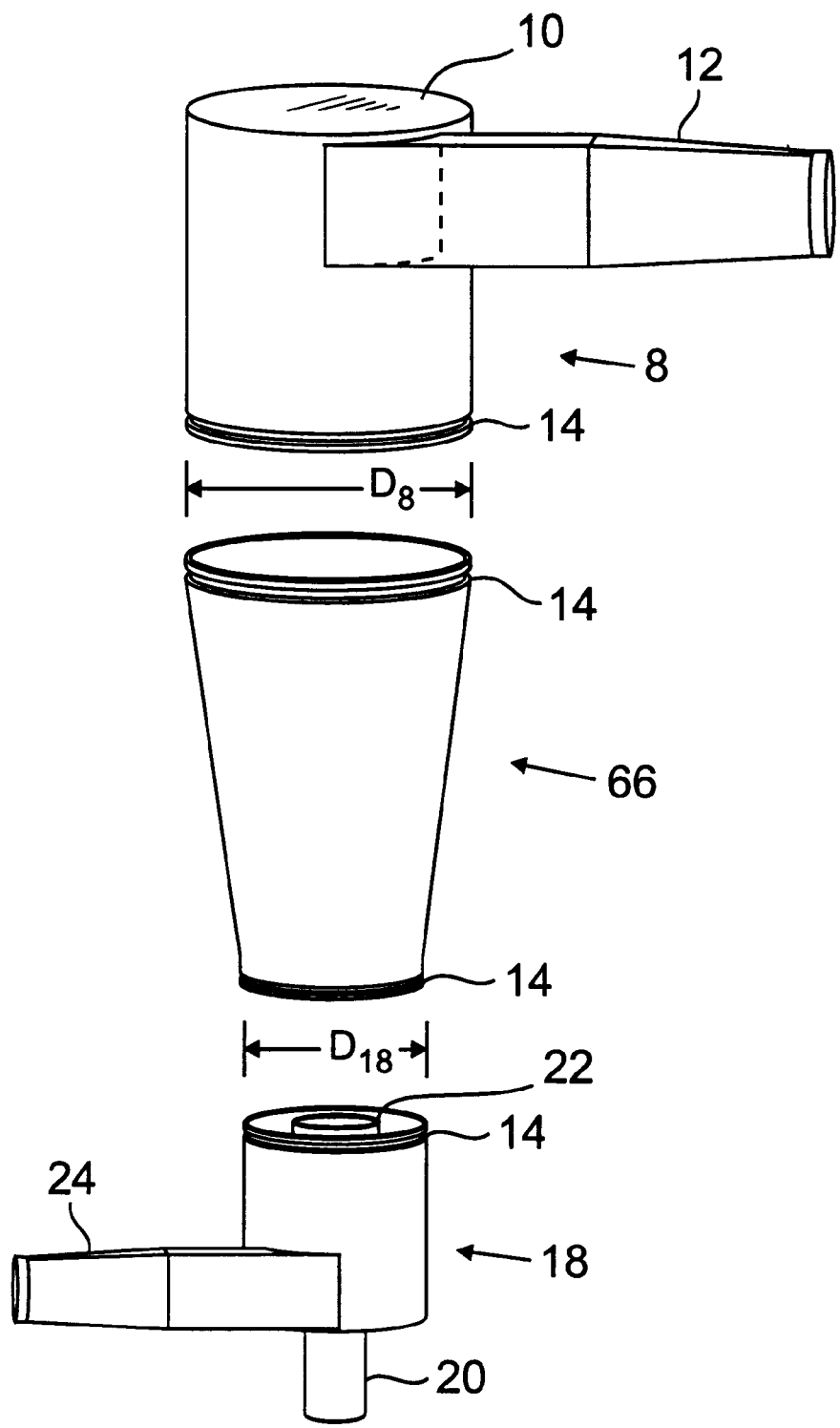
FIG. 6 is an exploded view of an alternate separator in accordance with the present invention, having a conical center section.

FIG. 6 shows an alternate embodiment of the device, which includes a conical body section 66. The conical body section may either increase (D18>D8) or decrease (D18<D8) in diameter as it approaches the outlet section 18. FIG. 6 shows one that decreases. The advantage of a decreasing diameter is that the fluid 27 will tend to rotate more quickly as the diameter is reduced (D18<D8), thereby increasing centrifugal forces on the particles. For some applications, however, an increasing diameter may be advantageous as it allows the particles 26a, 26b to separate further from each other in the radial direction perpendicular to the axis 6.

Figure 7:
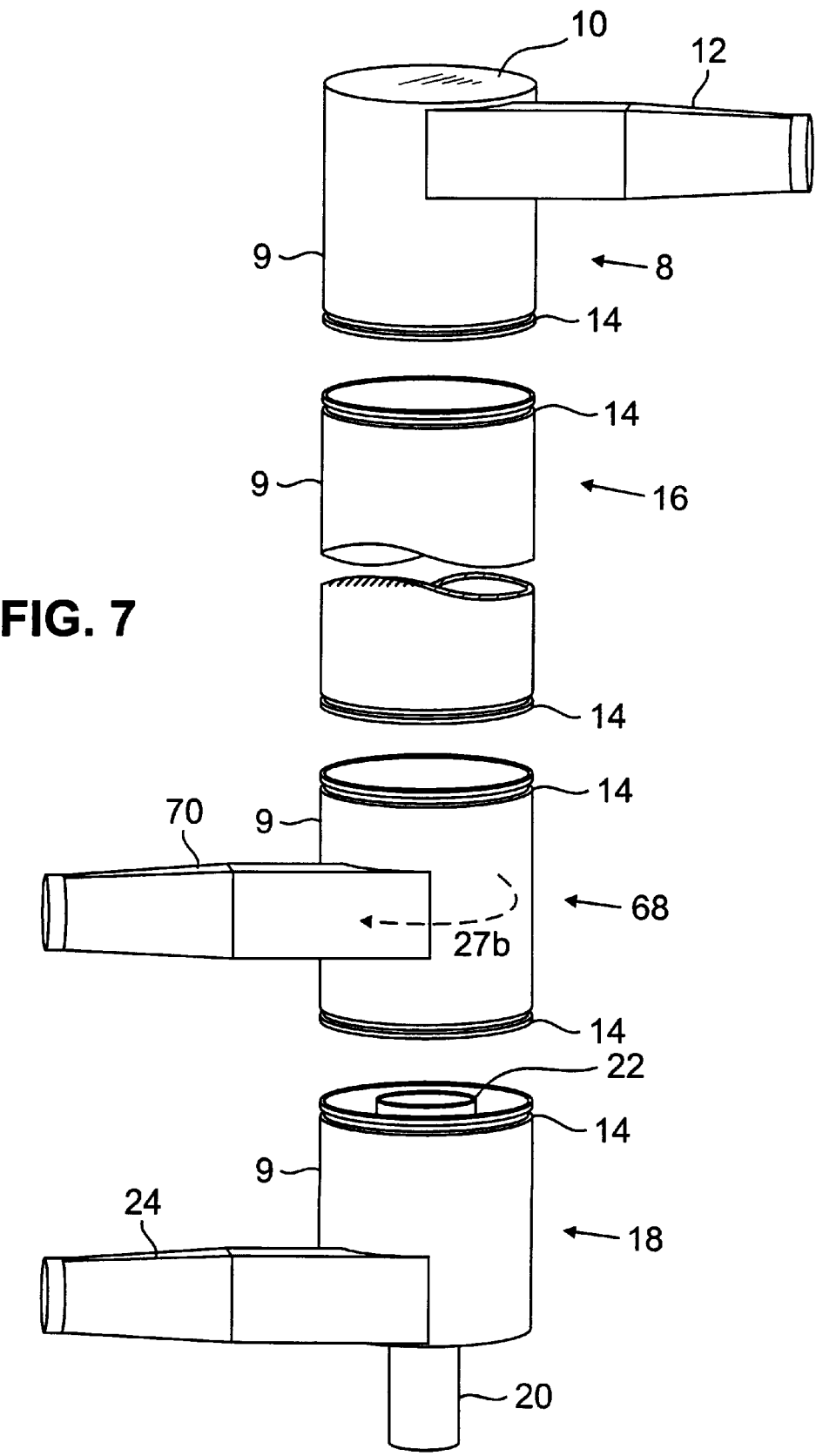
FIG. 7 is an exploded view of another alternative embodiment of the present separation invention incorporating an additional exit port disposed near the same end of the device as the first exit port.

FIG. 7 shows an alternate embodiment of the device in which an ancillary outlet section 68 is positioned between the central section 16 and the regular outlet section 18. The ancillary outlet section 68 has a tangentially mounted exit port 70 (disposed as described above with respect to the axis 6 and exit port 20) and is predominantly cylindrical in shape and is attached to the other sections by means of grooves 14. The ancillary exit port 70 allows some portion 27b of the fluid 27 and particles 26b that have concentrated along the interior of wall 9 to exit the device thereat.

Figure 8:
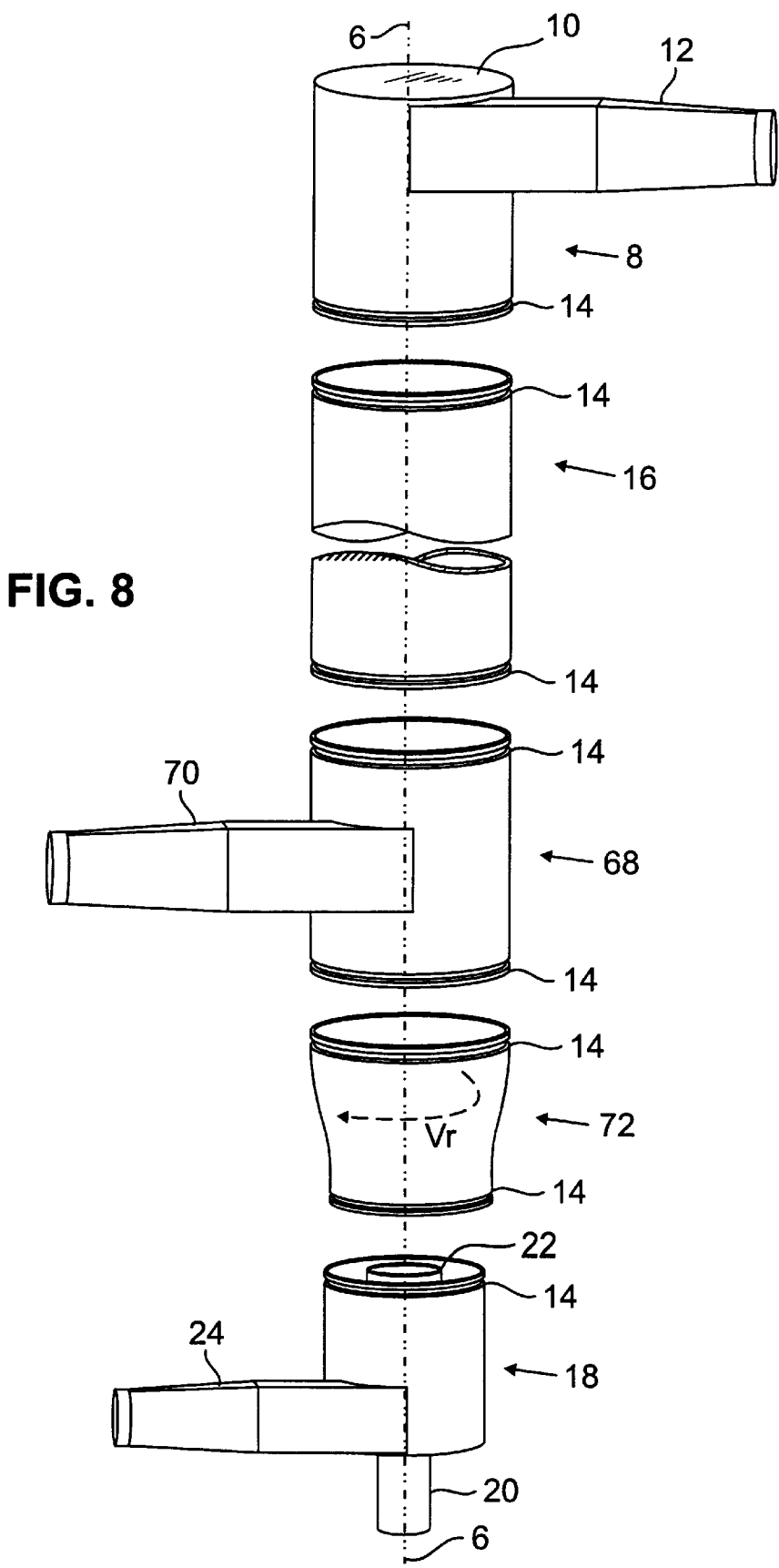
FIG. 8 shows an alternative embodiment of the device in FIG. 7 in accordance with the present invention having another separating section providing a reduction in cross-section between the first and second exit port.

FIG. 8 shows an embodiment similar to that of FIG. 7, except that a reducing section 72 has been added between the ancillary outlet section 68 and the normal outlet section 18. This reducing section can provide additional benefits where it is advantageous to cause rotational velocity Vr, of the fluid stream 27 to increase along the axis 6, compensating for the loss of fluid 27b out of the ancillary exit port 70.

Figure 9:
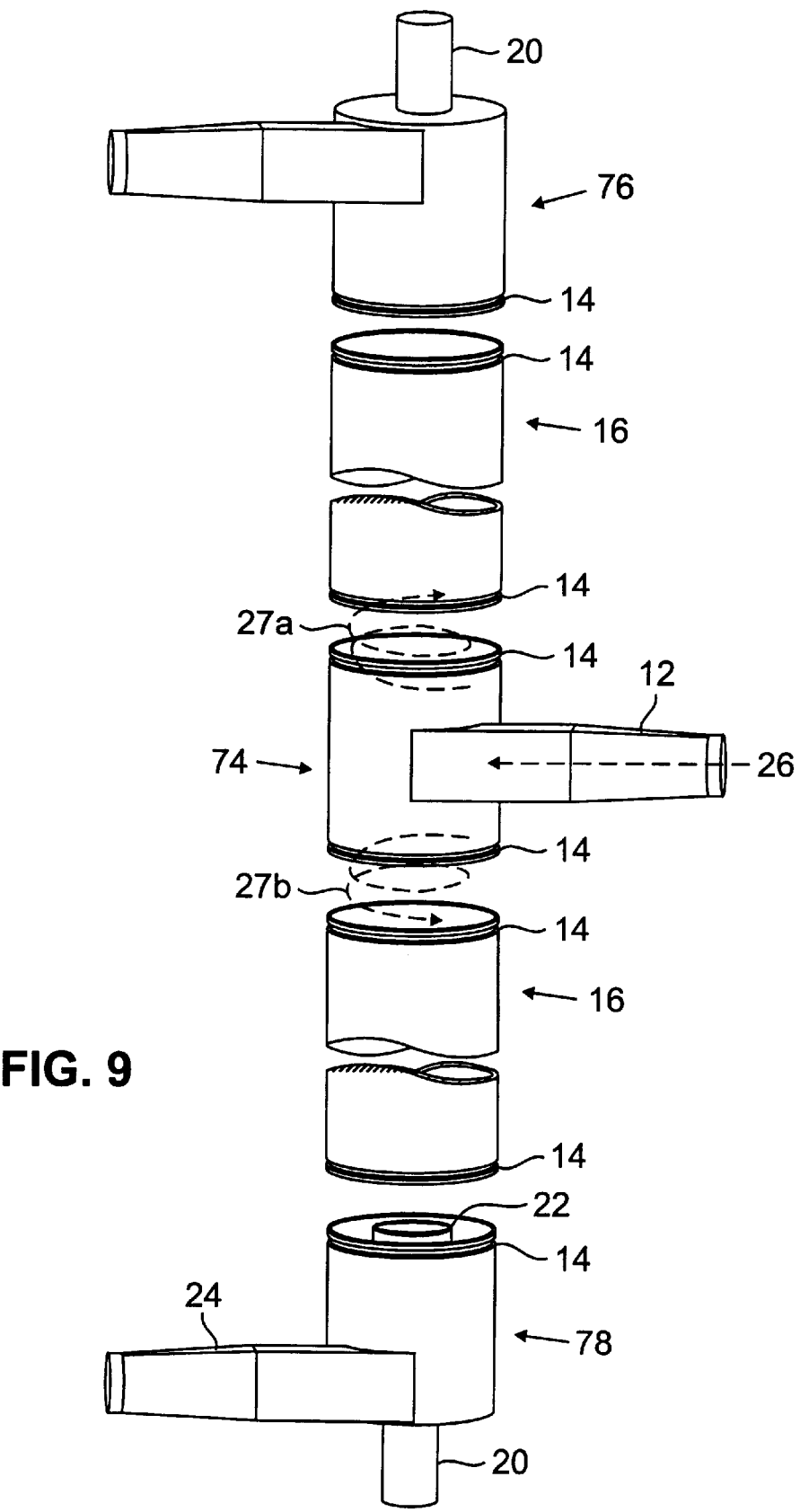
FIG. 9 shows yet another alternative separation device in accordance with the present invention having a plurality of outlet sections, with an inlet section therebetween.

FIG. 9 shows a novel embodiment in which a second central inlet section 74 supplies fluid to a plurality of outlet sections 76 and 78. In this embodiment, two outlet sections are shown on either side of inlet section 74. As the fluid 26 enters the entrance port 12, the fluid 26 splits into two equal streams 27a, 27b with half of it proceeding helically to the upper exit port 76 and half of it helically proceeding to the lower exit port 78. The advantage of this configuration is that a higher overall throughput rate can be achieved with a single separation device by eliminating one inlet section, The devices in FIGS. 1 through 8 are shown in a vertical orientation in which the inlet slurry stream 26 enters at the top of the units and exits at the bottom. In practice, these devices may operate in many other orientations. Specifically, the devices may be oriented such that the fluid enters at the bottom of the unit and exits at the top, or the devices may be oriented horizontally so that the fluid enters and exits the device at approximately the same height The devices can also be used at any angle between the purely vertical and purely horizontal.

Figure 10:
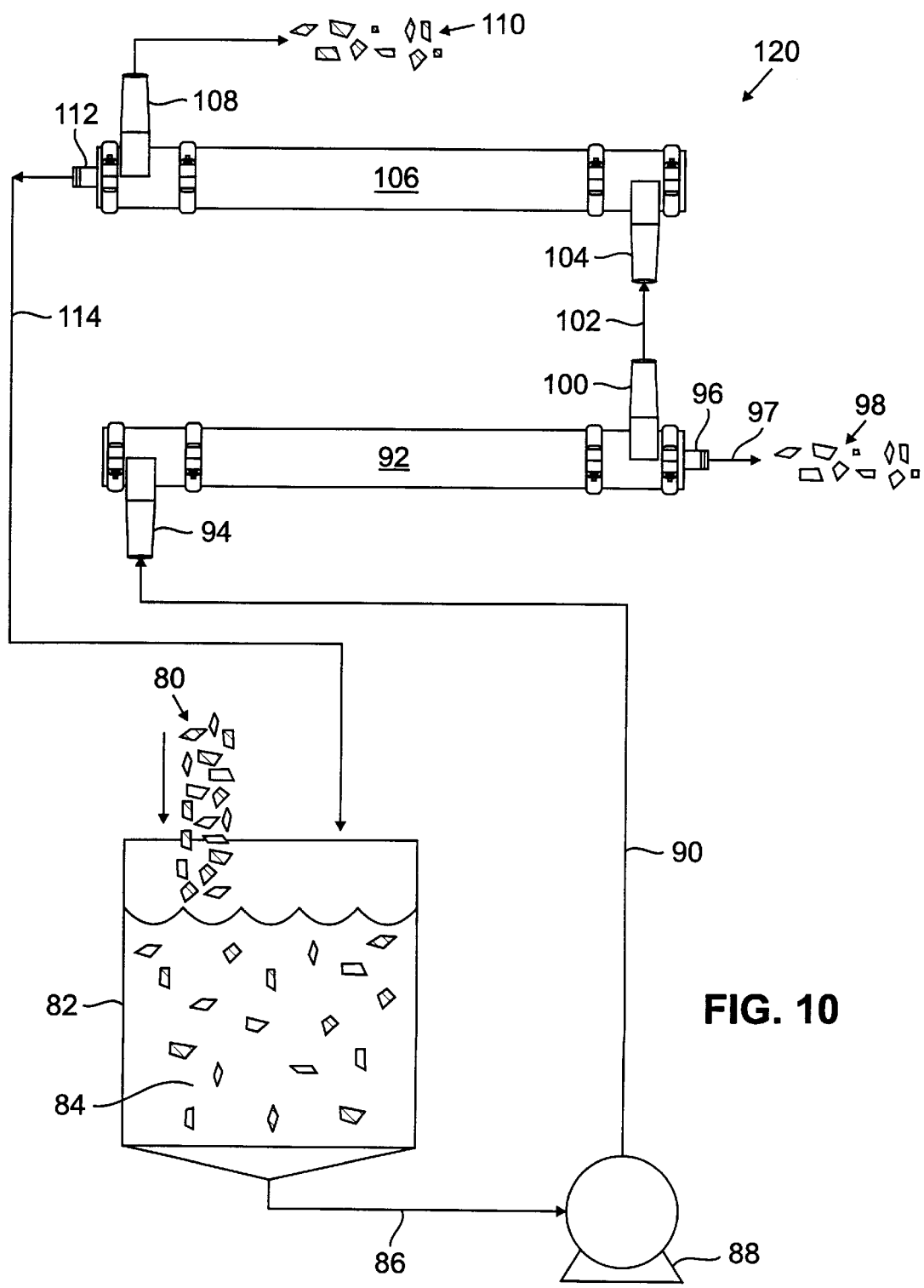
FIG. 10 illustrates an alternative embodiment of interconnected multiple separators of the present invention.

With regard to FIG. 10 there is shown an embodiment of a separator system indicated by numeral 120 in accordance with the present invention multiple instances of the device of FIG. 1 interconnected to provide a recursive purification configuration. A tank 82 is provided with a slurry 84 containing a mixture 80 of two different particulate materials (divided solids) as before. A pipe or conduit 86 carries the a flow of the slurry 84 to a pump 88 that drives the slurry through an outlet pipe 90 to a first inlet 94 of a first separator 92 in accordance with the present invention. The separator 92 has an axial outlet 96 which outputs separated stream 97 containing concentrated particulate material 98. The separator 92 has a tangential exit outlet 100 which outputs a concentrated stream 102 of the other material to another inlet 104 of a second separator 106 in accordance with the present invention The separator 106 concentrates the second material 110 as before and outputs the concentrated stream 109 containing material 110 at the tangential exit outlet 108. Axial outlet 112 of the second separator 106 directs the remaining other material as concentrated stream 114 back to the accumulating tank 82.

This shows how the constrained axial exit outlets 96, and 112 and the constrained tangential outlets 100, 108 can enable separator systems that can be configured for higher purification efficiency and the like. Knowledgeable practitioners of the separation arts can take advantage of this added flexibility and efficiency to construct other useful configurations.

For example, the outlets 100, 108 and inlets 94, 104 can be interconnected by configurations of manifolds comprised of multiple pipes and valves and connections (not shown) to provide a wide variety of systems of almost unlimited complexity for purification, separation, concentration and the like.

OPERATION—FIGS. 1A AND 3

Referring again to FIG. 1A, a slurry fluid carrying a stream 26 of mixed particles 26a, 26b enters through the entrance port 13. The rotating fluid 27 creates a centrifugal force field inside the body, causing some of the particles [26a] to migrate towards the axis 6 of the device and some of the particles [26b] to migrate away from the axis 6 towards the inside wall 32. The physical characteristics of the particles that affect their movement are density, shape, size, orientation in the flowing medium, and surface properties. The particles 26b that have migrated away from the axis of the device are removed by means of the outer exit port 24. The particles [26a] that have migrated towards the axis of the device are removed by means of the inner exit port 20.

Inlet port 12 and outlet port 24 are preferably provided with respective grooves 12e and 24e. Grooves 12e and 24e are adapted to connect to pipes or conduits (not shown) for interconnection in more complex systems. Grooves 12e, 24e may be of the same type as groove 14 or other standard or custom types, as required.

FIGS. 3A and 3B show the details of the outlet section 18. The vortex finder 22 allows the particles to separate at a point in the device where the rotational flow is smooth. The restricted extent of the exit aperture 23 while providing the advantage of a constrained output stream, does contribute to a perturbation in the flow field of the fluid in the vicinity of the exit end. This perturbation can result in unwanted mixing of the particle bodies that previously separated proximally nearer the inlet end. Such unwanted mixing decreases the efficiency of separation. Consequently additional particles of the otherwise inwardly directed solids can be entrained in the outlet stream 35.

The proximal end 43p of the vortex finder is positioned sufficiently upstream from the exit aperture 23, to allow such a perturbation to be acceptably small. Experimentation has shown that extending the vortex finder tube 22 proximally away from the exit aperture so the proximal end 43p is spaced away from the exit aperture 23, by a distance of about the height, he, of the aperture 23, reduces the perturbation to an acceptably small amount.

This advantage can be better understood if one considers what the action of the device would be in the absence of such a fixture. If there were no vortex finder, then the perturbation caused by the limited circumferential extent of the aperture 23 causes the fluid flow 27 in the vortex body 9 to be less uniform whereby outer exit port 24 to tend to suck some fluid from the axis of the device, thereby pulling some of the particles near the axis along with it. This would result in a lower separation efficiency.

Although preferred embodiments of the invention are described herein in detail, it will be understood by those skilled in the art that variations may be made thereto in number, size and material selection of the various elements of the invention and incorporating or deleting elements of the invention without departing from the spirit of the invention or the scope of the following claims.

Specifically, we claim:

1. A device for separating a mixture, the device comprising:
   an outer body defining a central longitudinal axis, the outer body comprising:
      a first inlet in fluid communication with the outer body, and
      a first outlet in fluid communication with the first inlet and oblique to the central longitudinal axis; and
   an inner body having a portion inside the outer body, the inner body comprising:
      a second inlet inside the outer body and in fluid communication with the first inlet, and
      a second outlet in fluid communication with the second inlet,
   the outer body and the portion of the inner body inside the outer body defining a vortex space therebetween,
   wherein when the mixture is introduced into the first inlet, rotational flow separates a portion of the mixture into the first outlet and another portion of the mixture into the second outlet.

2. The device of claim 1, wherein the vortex space is a wholly obstruction-free space.

3. The device of claim 1, wherein the vortex space extends from the first inlet to the first outlet.

4. The device of claim 1, wherein a portion of the first outlet is tangential to a portion of the outer body.

5. The device of claim 4, wherein the first outlet is adjacent to the vortex space.

6. The device of claim 1, wherein the first and second outlets are adjacent to an end of the outer body.

7. The device of claim 1, wherein a portion of the first inlet is tangential to the outer body.

8. The device of claim 1, wherein the inner body defines a second central longitudinal axis coaxial with the central longitudinal axis of the outer body.

9. The device of claim 1, wherein the outer body has a round interior perimeter.

10. The device of claim 1, wherein the outer body is substantially cylindrical.

11. The device of claim 1, wherein the device is composed of sections.

12. The device of claim 11, wherein the sections comprise couplings adapted to provide a liquid-tight seal between the sections.

13. The device of claim 1, wherein the inner body is removable from the outer body.

14. The device of claim 1, wherein the outer body further comprises a cone disposed adjacent to the first inlet, the cone being aligned coaxially with the central longitudinal axis.

15. The device of claim 1, wherein the first and second outlets comprise couplings adapted to provide the first and second outlets with fluid tight attachments to conduits.

16. The device of claim 1, wherein the first inlet is oblique to an outer portion of the outer body.

17. The device of claim 1, wherein the first inlet is oblique to the central longitudinal axis.

18. The device of claim 1, wherein the outer body further comprises a portion of varying diameter.

19. The device of claim 1, wherein the first outlet is coaxial with the central longitudinal axis.

20. The device of claim 1, wherein the second outlet comprises a portion substantially parallel to the central longitudinal axis.

21. The device of claim 1, wherein the second outlet is coaxial with the central longitudinal axis.

22. The device of claim 1, wherein the outer body further comprises a third outlet between the first inlet and the first outlet.

23. The device of claim 22, further comprising a portion of varying diameter between the third outlet and the first outlet.

24. The device of claim 1, wherein
   the outer body further comprises a third outlet in fluid communication with the first inlet, and
   the device further comprises:
      a second inner body having a portion inside the outer body, the second inner body comprising:
         a third inlet inside the outer body and in fluid communication with the first inlet, and
         a fourth outlet in fluid communication with the third inlet,
   wherein the first inlet is between the second and fourth outlets.

25. A system, comprising:
   a first device for separating a mixture, the device comprising:
      a first outer body defining a first central longitudinal axis, the outer body comprising:
         a first inlet in fluid communication with the first outer body, and
         a first outlet in fluid communication with the first inlet and oblique to the first central longitudinal axis; and
      a first inner body having a portion inside the first outer body, the first inner body comprising:
         a second inlet inside the first outer body and in fluid communication with the first inlet, and
         a second outlet in fluid communication with the second inlet, the first outer body and the portion of the first inner body inside the first outer body defining a second vortex space therebetween, wherein when the mixture is introduced into the first inlet, rotational flow separates a first portion of the mixture to the first outlet and a second portion of the mixture to the second outlet; and a second device for separating a mixture, the device comprising:
a second outer body defining a second longitudinal axis, the second outer body comprising:
a third inlet in fluid communication with the first or second outlet;
a third outlet in fluid communication with the third inlet and oblique to the second longitudinal axis; and
a second inner body having a portion inside the second outer body, the second inner body comprising:
a fourth inlet inside the second outer body and in fluid communication with the third inlet, and
a fourth outlet in fluid communication with the fourth inlet,
the second outer body and the portion of the second inner body inside the second outer body defining a vortex space therebetween,
wherein when the first or second portion of the mixture is introduced into the third inlet, rotational flow separates a third portion of the mixture to the third outlet and a fourth portion of the mixture to the fourth outlet.

26. A method of separating a mixture of materials, the method comprising:
providing a device comprising:
an outer body defining a central longitudinal axis, the outer body comprising:
a first inlet in fluid communication with the outer body, and
a first outlet in fluid communication with the first inlet and oblique to the central longitudinal axis; and
an inner body having a portion inside the outer body, the inner body comprising:
a second inlet inside the outer body and in fluid communication with the first inlet, and
a second outlet in fluid communication with the second inlet,
the outer body and the portion of the inner body inside the outer body defining a vortex space therebetween; and
introducing the mixture into the first inlet, wherein rotational flow separates a first portion of the mixture into the first outlet and a second portion of the mixture into the second outlet.

27. The method of claim 26, further comprising separating the first or second portion of the mixture into a third portion and a fourth portion.

28. The method of claim 26, wherein the vortex space is a wholly obstruction-free space.

29. The method of claim 26, wherein a portion of the first outlet is tangential to a portion of the outer body and adjacent to the vortex space.

* * * * *